United States Patent

[11] 3,574,322

| [72] | Inventors | Richard H. Hancock<br>Orchard Lake;<br>Dale O. Hargraves, Drayton Plains, Mich. |
|---|---|---|
| [21] | Appl. No. | 860,945 |
| [22] | Filed | Sept. 25, 1969 |
| [45] | Patented | Apr. 13, 1971 |
| [73] | Assignee | General Motors Corporation<br>Detroit, Mich. |

[54] TWO-POSITION STEP FOR BUSES
3 Claims, 6 Drawing Figs.

[52] U.S. Cl. ................................................. 180/102, 280/166
[51] Int. Cl. ................................................. B60v 3/02
[50] Field of Search ..................................... 280/166, 163; 105/447; 180/102

[56] References Cited
UNITED STATES PATENTS

| 2,146,668 | 2/1939 | Baade | 105/447 |
| 2,951,454 | 9/1960 | Candlin, Jr | 280/166 |
| 1,915,327 | 6/1933 | McWhirter | 180/102 |

*Primary Examiner*—Kenneth H. Betts
*Assistant Examiner*—Robert R. Song
*Attorneys*—W. E. Finken and D. L. Ellis ABSTRACT: A bus-type vehicle body has a step arrangement mounted in the door stepwell thereof which step arrangement is movable between a retracted position wherein a step panel portion thereof closes the opening in the interior floor to the stepwell while a frame portion thereof closes the lower portion of the vehicle body door opening, and an extended position wherein the step panel provides a step between ground level and the interior floor level. The step panel portion is arranged to invert its surfaces when moving between its interior floor closing position and its step forming position and a pressure sensitive switch pad on the step panel moves therewith between exposed and concealed positions during the inversion.

PATENTED APR 13 1971

INVENTORS
Richard H. Hancock, &
BY Dale O. Hargraves

D.L. Ellis
ATTORNEY

PATENTED APR 13 1971

INVENTORS
Richard H. Hancock, &
Dale O. Hargraves
BY D. L. Ellis
ATTORNEY

TWO-POSITION STEP FOR BUSES

This invention relates generally to step arrangements for vehicles and in particular to step arrangements for bus type vehicles.

The primary feature of this invention is that it provides a new and improved step arrangement for vehicles. Another feature of this invention is that it provides an improved vehicle step arrangement including a step frame pivotally mounted on the vehicle body, a step panel pivotally mounted on the step frame and control linkage between the step panel and the vehicle body operative during pivotal movement of the step frame to define a path of articulative movement of the step panel between a first position wherein it substantially closes the stepwell opening in the floor and a second position wherein the step panel is inverted relative to the initial position and reposes in a horizontal attitude on the step frame to form a step surface on the vehicle body below floor level. Yet another feature of this invention resides in the provision in the step arrangement of means for detecting the presence of foreign bodies on the step arrangement or in the adjacent area and for preventing any movement of the step frame and step panel upon such detection. Still another feature of this invention is that it provides a vehicle step arrangement wherein the aforementioned detection means includes a pressure sensitive switch pad on one surface of the step panel which pad is exposed in the first position of the step panel and concealed in the second position of the step panel while remaining operative in both positions to detect the presence of foreign bodies on the step panel.

These and other features of this invention will be readily apparent from the following specification and from the drawings wherein.

Figure 1:
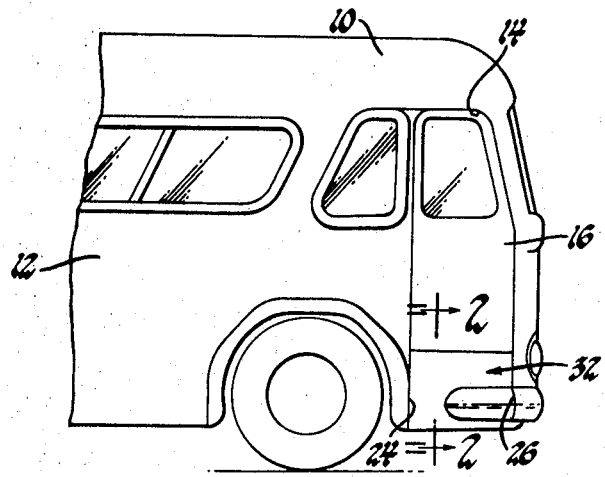
FIG. 1 is a partial side elevational view of a bus type vehicle having a step arrangement according to this invention.
Figure 2:
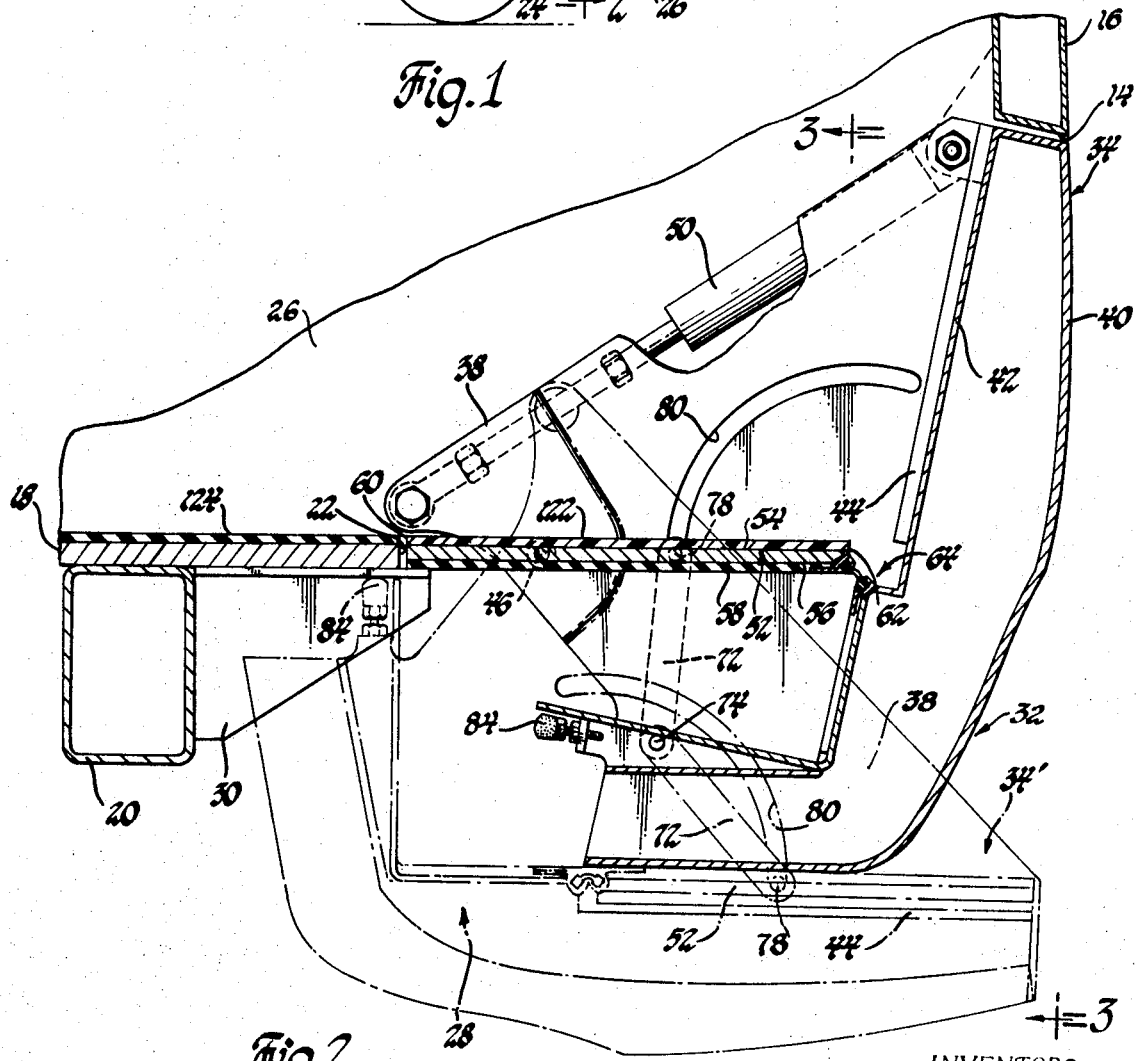
FIG. 2 is an enlarged sectional view taken generally along the plane indicated by lines 2-2 in FIG. 1.

Referring now to FIGS. 1 and 2 of the drawings, a bus type vehicle body 10 has a sidewall 12 with a door opening 14 therein. A door 16 is vertically hinged on the vehicle body sidewall in a conventional manner for swinging movement relative to the door opening between an open position and a closed position, FIG. 1, wherein the door closes the upper portion of the opening. A floor structure 18 is suitably supported within the vehicle body, as by a frame rail 20, and has a generally rectangular recess 22 therein adjacent the lower portion of the door opening. Recess 22, in combination with vertical body bulk heads 24 and 26, seen best in FIGS. 3 and 5, defines a stepwell generally designated 28. Frame rail 20 has a pair of support brackets fixed thereto, of which only one bracket 30 is shown, FIGS. 2 and 3. A vehicle step arrangement 32 is mounted on the vehicle body within the stepwell 28 for movement between an extended position, shown in broken lines in FIG. 2, and a retracted position, shown in FIG. 1 and in solid lines in FIG. 2.

Figure 3:
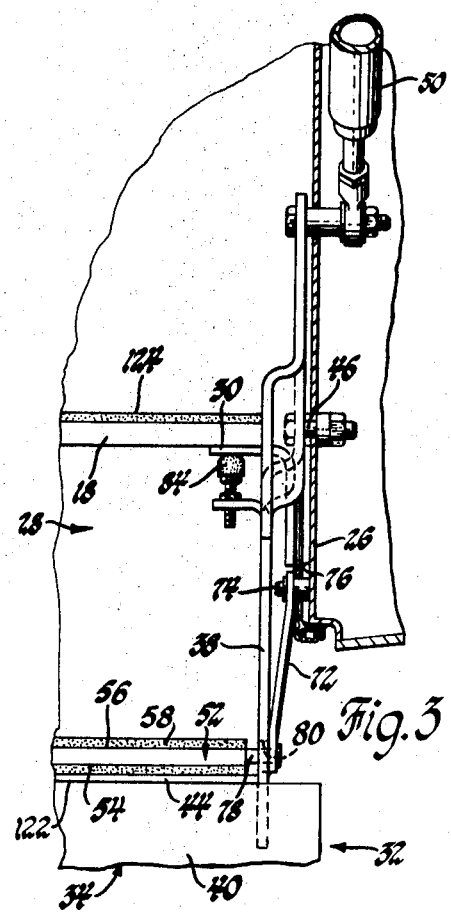
FIG. 3 is a partial view taken generally along the plane indicated by lines 3-3 in FIG. 2 and showing the step arrangement in the extended position thereof.
Figure 5:
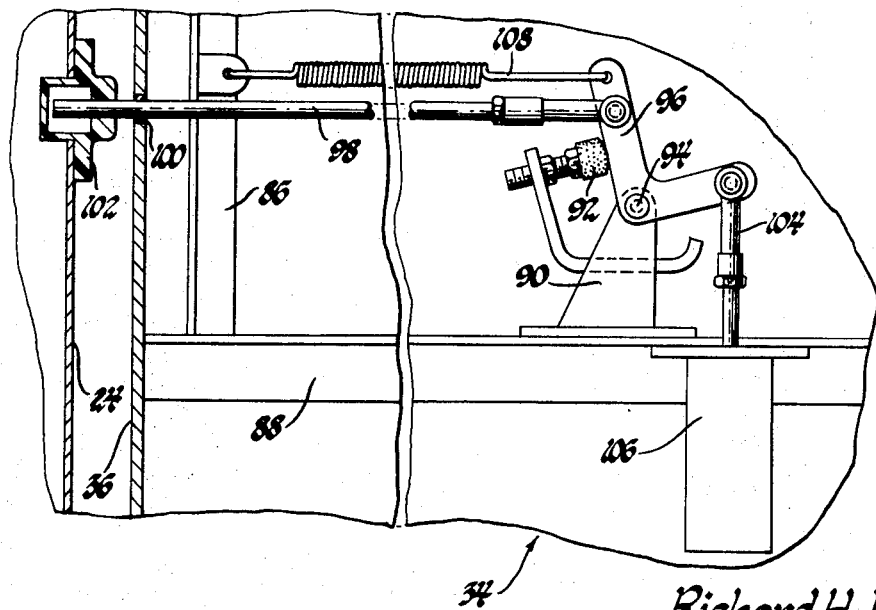
FIG. 5 is a partial broken away elevational view of the step arrangement in the retracted position thereof and showing the locking system therefor.

Referring more particularly now to FIGS. 2, 3 and 5 in description of the vehicle step arrangement, a step frame 34 includes a pair of side panels 36 and 38 joined in spaced relationship by an exterior panel 40 and by an interior panel 42 having a decorative trim panel 44 thereon. Frame 34 is pivotally mounted on the body bulk heads within the stepwell 28 by a pair of longitudinally aligned studs, of which only one stud 46 is shown, and is swingable about the longitudinal horizontal axis defined through these studs by a conventional hydraulic cylinder and piston actuator 50. In the raised position, shown in solid lines in FIG. 2, the frame 34 closes the lower portion of the door opening 14 and with door 16, provides continuity of appearance thereacross, and in the lowered position, shown in broken lines in FIG. 2, interior panel 42 and trim panel 44 define a generally horizontal surface providing support for a step panel as will appear hereinafter.

The step panel designated 52, includes an upper surface 54, a lower surface 56 with a step tread 58 thereon, an inboard edge 60 and an outboard edge 62. Step panel 52 is pivotally connected to interior panel 42 across the entire width thereof by a hinge 64 which, as seen best in FIG. 4, includes a pair of leaves 66 and 68 attached respectively to step panel outboard edge 62 and to interior panel 42 and joined together by a web member 70 fabricated of a flexible and extensible material such as rubber. A control link 72 has one end thereof pivotally mounted on a stud 74 extending from a portion 76 of the adjacent body bulk head which stud defines a horizontal axis about which the link 72 pivots relative to the vehicle body. The other end of control link 72 is pivotally attached to a pin 78 extending from the step panel and protruding through an elongated arcuate aperture 80 in side panel 38.

The link 72 cooperates with the step frame to define a range of positions of the step panel relative to the step frame and the vehicle body. The hinge 64 and step panel outboard edge 62 rotate with the step frame generally in a circular path about studs 46 as the step frame pivots clockwise, FIG. 2, thereabout. The link 72, however, constrains the step panel at pin 78 to rotate in a circular path about stud 74. In the raised position of the step frame, interior panel 42 and trim panel 44 assume a generally vertical orientation with the hydraulic cylinder and piston actuator being fully extended. The corresponding orientation of control link 72 defines a first position for step panel 52 with surface 54 thereof facing upward, so that the step panel and trim panel subtend an angle of approximately 90°, measuring clockwise from the step panel in FIG. 2.

Relative to the step frame, the step panel 52 exhibits only rotational movement about an axis defined by hinge 64 and is constrained by the control link to rotate clockwise so that when the step frame reaches the fully lowered position 34' the angle subtended by the step panel and trim panel 44 is 0° and the step panel reposes thereon as seen in FIG. 2. However, in terms of motion relative to the vehicle body, the step panel exhibits both translatory and rotational movement as a result of being constrained at two points to move in separate nonconcentric paths. As the step frame is caused to rotate clockwise by actuator 50, control link 72 defines a range of positions for the step panel from the first position thereof such that upon arrival of the step frame at position 34' the step panel is in a second position wherein it has been bodily flipped over or rotated substantially 180° from the first position thereof and wherein it reposes on trim panel 44 to form a horizontal step surface below the floor structure with step tread 58 thereof facing upward.

Counterclockwise movement of the step frame from position 34' back toward the raised position thereof initiates counterclockwise idling movement of the control link 72 and results in plane motion of the step panel opposite to that just described.

The final lowered position of the step frame and step panel may be adjusted by means of a pair of adjustable rubber bumpers 84 attached to flanges integral with the side panels of the step frame. As best seen in FIG. 2, the bumper 84 engages the underside of support bracket 30 to limit the clockwise movement of the step frame, thereby defining a lowered position 34' thereof.

Referring now to FIG. 5 in description of the step arrangement locking system, a pair of internal reinforcing members 86, 88 are rigidly secured within the step frame 34. A bracket 90 including an adjustable bumper 92 is fixedly secured to the member 88 and has rotatably mounted thereon at 94, a bellcrank 96. A shiftable locking rod 98 extends generally longitudinally of the step frame with a free end thereof protruding through an aperture 100 in side panel 36 and with the other end thereof pivotally connected to one leg of the bellcrank 96. The free end of rod 98 is received within a striker receptacle 102 mounted on body bulk head 24. The second leg of bellcrank 96 has pivotally attached thereto one end of a shaft 104 which shaft is adapted for actuation such as by a solenoid 106 secured to the member 88. A spring 108 mounted between member 86 and the bellcrank 96 biases the latter counterclockwise, FIG. 5, into engagement with bumper 92, in which position the free end of rod 98 is confined within receptacle 102, thereby locking the side panel 36 and the step frame against pivotal movement.

Figure 6:
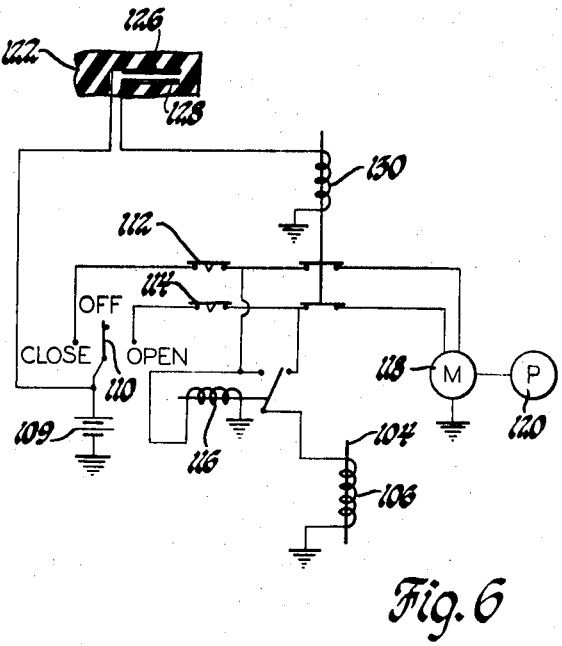
FIG. 6 is a schematic diagram of the step arrangement control circuit.

The step arrangement control circuit, FIG. 6, includes an energy source, such as a battery 109, a three-position switch 110, a pair of vehicle mounted normally closed limit switches 112 and 114, a relay 116, the aforementioned solenoid 106, and a reversible electric motor 118 which motor drives reversible hydraulic pump 120 serving the hydraulic cylinder and piston actuator 50. With the step arrangement in the retracted position and with switch 110 in the "OFF" position, solenoid 106 is deactivated, thus allowing spring 108 to lock the step frame in raised position. Limit switch 112 is held open by the step frame to prevent further raising thereof and relay 116 is inoperative.

Moving switch 110 to "OPEN" position activates solenoid 106 to withdraw locking rod 98 from receptacle 102 and simultaneously activates the motor 118 to drive the step frame 34 to lowered position. Upon reaching position 34', the step frame opens limit switch 114 to break the motor operating circuit loop and halt step frame lowering movement while allowing limit switch 112 to close. To raise the step frame, the switch 110 is moved to "CLOSE" position completing the circuit loop to motor 118. Simultaneously, the relay 116 is activated so that solenoid 106 is energized through the "CLOSE" circuit loop to maintain the locking rod 98 in unlocking position. When the step frame reaches raised position, the limit switch 112 is opened to deactivate the motor 118 and deenergize the solenoid 106 so that spring 98 can relock the step frame as described.

Figure 4:
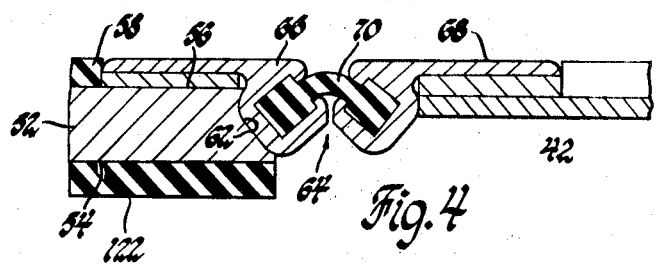
FIG. 4 is an enlarged view of a portion of FIG. 2 showing the pivotal connection between the step panel and the step frame in the lowered position of the latter.

In the preferred embodiment, and as seen best in FIGS. 2 and 4, safety shutoff means are provided, including switch pads 122 and 124 on step panel upper surface 54 and on the floor structure surrounding the stepwell, to prevent movement of the step arrangement when foreign bodies are present thereon or in the area adjacent thereto. The switch pads 122 and 124 are of a conventional design wherein a plurality of internal conductors are spaced at small intervals within an insulating body such as a rubber mat so that the pressure of a body on the mat initiates contact between the conductors which contact completes an external circuit. In FIG. 6, typical internal conductors 126 and 128 normally maintain a relay 130 in deactivated condition wherein the "OPEN" and "CLOSE" control circuit loops are unaffected. Should a bus passenger or some foreign body be present on either of the switch pads, the conductors make contact to close the circuit and activate the relay 130 which will then interrupt both the "OPEN" and "CLOSE" circuit loops to make further operation of the motor 118 and the step frame impossible so long as the passenger foreign body remains on the pad.

In description now of a typical operational sequence of the step arrangement, it is assumed that the step frame 34 is in its normal or retracted position shown in solid lines in FIG. 2, wherein the step panel 52 assumes a horizontal position substantially closing floor opening 22 at the floor level with outboard edge 62 supported through hinge 64 and inboard edge 63 supported by the pair of support brackets fixed to frame rail 20. For passenger ingress and egress, door 16 is swung open and switch 110 is moved to "OPEN" position. With no passenger or foreign bodies present on the step panel or in the general area of the step arrangement, the "OPEN" circuit loop is completed to simultaneously unlock the step frame and initiate movement thereof to the fully lowered position 34'. During movement of the step frame to position 34', the step panel 52 is displaced and inverted or flipped over relative to the vehicle body, as described, until it assumes a generally horizontal position, shown in broken lines in FIG. 2, wherein it reposes on trim panel 44 and is completely supported thereby with the step tread 58 exposed to provide a horizontal step surface on the vehicle body below the floor structure.

With the step arrangement having thus assumed its extended position, the switch pad 122 is concealed between the step panel 52 and the trim panel 44, FIG. 4. The extensible nature of the web manner 70, however, permits limited linear displacement of the step panel under pressure of a passenger standing thereon so that such pressure is transmitted to the concealed switch pad 122, thereby maintaining the sensitivity of the conductors therein and preserving the safety shutoff character thereof. Thus, in the extended position of the step arrangement, should a passenger or foreign body be present on step tread 58 or on the floor structure surrounding the stepwell, no movement of the step frame will occur.

Following passenger ingress or egress, and assuming no passengers present on the switch pad 124 or on step tread 58, the hydraulic cylinder and piston actuator, upon activation thereof, rotates the step frame counterclockwise, bringing the step frame and step panel back to their normal positions wherein the former closes the lower portion of the door opening and the latter covers the stepwell.

We claim:

1. In a vehicle body having a door opening, a door for openably closing a portion of said opening and a floor structure, said floor structure having an opening therein to a stepwell adjacent the lower portion of said door opening, a step arrangement comprising: a closure and step frame; means defining a first horizontal axis on said vehicle body and mounting said closure and step frame thereon for rotation about said first horizontal axis; a step panel; means mounting said step panel on said closure and step frame for pivotal movement relative thereto; a control link; means defining a second horizontal axis on said vehicle body and mounting a first end of said control link thereon for rotation of said control link about said second horizontal axis; and means connecting a second end of said control link to said step panel, said control link upon pivotal movement of said closure and step frame about said first horizontal axis defining a plurality of positions of said step panel relative to said frame and to said vehicle body including a first position wherein said step panel forms a horizontal surface closing said stepwell opening in said floor structure and a second position wherein said step panel is inverted relative to said first position and forms a horizontal step surface on said vehicle below said floor structure.

2. In a vehicle body having a door opening, a door for closing a portion of said opening and a floor structure, said floor structure having an opening therein to a stepwell adjacent the lower portion of said door opening, a step arrangement comprising: a closure and step frame; means defining a first horizontal axis on said vehicle body and mounting said step frame thereon within said stepwell for pivotal movement about said first horizontal axis between raised and lowered positions, said closure and step frame in the raised position thereof closing the remainder of said door opening and in the lowered position thereof providing a substantially horizontal support surface at the lower margin of said door opening; a step panel including an upper and a lower surface; means mounting said step panel on said closure and step frame for pivotal movement relative thereto; means on said step panel upper surface for detecting the presence thereon of foreign bodies; tread means on said step panel lower surface; a control link, means defining a second horizontal axis on said vehicle body and mounting thereon a first end of said control link for rotation of said control link about said second horizontal axis; and means connecting a second end of said control link to said step panel, said control link upon pivotal movement of said closure and step frame from said raised to said lowered position defining a plurality of positions of said step panel relative to said closure and step frame and to said vehicle body including a first position occurring in the raised position of said closure and step frame wherein said step panel closes said floor opening at the level of said floor structure with said detection means exposed and a second position occurring in the lowered position of said closure and step frame wherein said step panel is inverted relative to said initial position and reposes on said horizontal support surface provided by said closure and step frame in the lowered position thereof with said tread surface being exposed to form a step surface on said vehicle body below floor level and said detection means being concealed against said support surface.

3. In a vehicle body having a door opening, a door for openably closing a portion of said opening and a floor structure, said floor structure having an opening therein to a stepwell adjacent the lower portion of said door opening, a step arrangement comprising: a closure and step frame; means defining a first horizontal axis on said vehicle body and mounting said closure and step frame thereon within said stepwell for pivotal movement about said first horizontal axis between a raised position and a lowered position, said closure and step frame in the raised position thereof closing a portion of said door opening and in the lowered position thereof providing a substantially horizontal surface at the lower margin of said door opening; actuator means for driving said closure and step frame between said raised and lowered positions; an energy source linked to said actuator for powering the latter; a step panel including an upper surface and a lower surface; a hinge mounting said step panel on said step frame for pivotal movement relative thereto, said hinge including a flexible and extensible web member permitting limited linear displacement of said step panel relative to said step frame; pressure sensitive covering means on said step panel upper surface for detecting the presence thereon of foreign bodies; circuitry linking said pressure sensitive covering means and said energy source so that upon detection of foreign bodies on said pressure sensitive covering means, operation of said actuator means is rendered impossible; tread means on said step panel lower surface; a control link; means defining a second horizontal axis on said vehicle body and mounting thereon one end of said control link for pivotal movement of said control link about said second horizontal axis; and means pivotally connecting the other end of said control link to said step panel, said control link upon pivotal movement of said closure and step frame from said raised to said lowered position thereof defining a plurality of positions of said step panel including a first position, occurring in the raised position of said closure and step frame, wherein said step panel forms a horizontal closure for said floor opening at floor level with said pressure sensitive covering means exposed and a second position occurring in said lowered position of said closure and step frame wherein said step panel is inverted relative to said first position and reposes on said horizontal surface provided by said closure and step frame in the lowered position thereof with said tread means exposed to form a step surface on said vehicle body below floor level and with said pressure sensitive covering means concealed between said step panel and said step frame yet operative through said flexible and extensible web member to detect the presence of foreign bodies on said exposed tread surface.